(12) United States Patent
Reuter et al.

(10) Patent No.: US 7,341,801 B2
(45) Date of Patent: Mar. 11, 2008

(54) POLYTHIOPHENES HAVING ALKYLENEOXYTHIA THIOPHENE UNITS IN ELECTROLYTE CAPACITORS

(75) Inventors: Knud Reuter, Krefeld (DE); Udo Merker, Köln (DE); Friedrich Jonas, Aachen (DE)

(73) Assignee: H.C. Starck GmbH (DE)

( * ) Notice: Subject to any disclaimer, the term of this patent is extended or adjusted under 35 U.S.C. 154(b) by 332 days.

(21) Appl. No.: 10/889,491

(22) Filed: Jul. 12, 2004

(65) Prior Publication Data
US 2005/0013094 A1 Jan. 20, 2005

(30) Foreign Application Priority Data
Jul. 14, 2003 (DE) ................ 103 31 673

(51) Int. Cl.
*H01M 4/00* (2006.01)
(52) U.S. Cl. ............... 429/128; 429/213; 429/30; 361/523; 29/25.03; 427/80; 252/511; 528/373
(58) Field of Classification Search ........... 429/128, 429/30, 213; 528/373; 361/523; 252/511; 29/25.03; 427/80
See application file for complete search history.

(56) References Cited

U.S. PATENT DOCUMENTS

| 4,910,645 | A | | 3/1990 | Jonas et al. ............. 361/525 |
|---|---|---|---|---|
| 4,959,430 | A | | 9/1990 | Jonas et al. ............. 526/257 |
| 4,987,042 | A | | 1/1991 | Jonas et al. ............. 429/213 |
| 5,035,926 | A | | 7/1991 | Jonas et al. ............. 427/393.1 |
| 6,375,688 | B1 | * | 4/2002 | Akami et al. ........... 29/25.03 |

FOREIGN PATENT DOCUMENTS

JP  2000-21687  1/2000

OTHER PUBLICATIONS

Adv. Mater. 12, (month unavailable) 2000, pp. 481-494, L. "Bert" Groenendaal et al, "Poly(3,4-ethylenedioxythiophene) and Its Derivatives: Past, Present, and Future".
Chem. Mater., 7, (month unavailable) 1995, pp. 58-68, Chenggang Wang et al, "Poly(3,4-ethylenedithiathiophene). A New Soluble Conductive Polythiophene Derivative".
Electrochimica Acta, vol. 39, (8/9), (month unavailable) 1994, pp. 1345-1347, Friedrich Jonas et al, "Technical Applications for Conductive Polymers".
Proceedings of the 15$^{th}$ European Passive Components Symposium CARTS-Europe 2001, Copenhagen Denmark, pp. 24-29, I. Horacek et al, "Improved ESR on $MnO_2$ Tantalum Capacitors at Wide Voltage Range".
Org. Lett. 4(4), (month unavailable) 2002, pp. 607-609, Philippe Blanchard et al, "Thieno[3,4b]-1,4-oxathiane: An Unsymmetrical Sulfur Analogue of 3,4-Ethylenedioxythiophene (EDOT) as Building Block for Linear π-Conjugated Systems".

* cited by examiner

*Primary Examiner*—Jane Rhee
(74) *Attorney, Agent, or Firm*—Connolly Bove Lodge & Hutz LLP

(57) ABSTRACT

Electrolyte capacitors containing certain polythiophenes are described. More particularly, the polythiophenes have backbones containing repeating units of the following general formula (I) and/or repeating units of the following general formula (II),

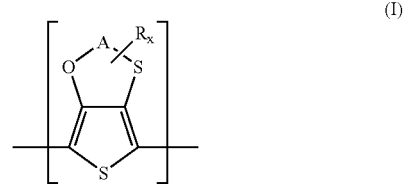

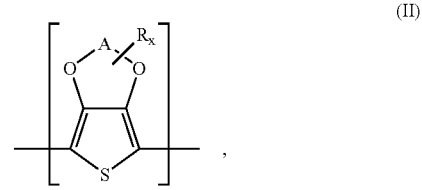

wherein A is, for example, a $C_1$-$C_5$-alkylene radical, R is, for example, a $C_1$-$C_{18}$-alkyl radical, and x is an integer from 0 to 8. Also described are dispersions comprising such polythiophenes, and the use of such polythiophenes or dispersions thereof for producing conductive layers.

22 Claims, No Drawings

POLYTHIOPHENES HAVING ALKYLENEOXYTHIA THIOPHENE UNITS IN ELECTROLYTE CAPACITORS

CROSS REFERENCE TO RELATED PATENT APPLICATION

The present patent application claims the right of priority under 35 U.S.C. §119 (a)-(d) of German Patent Application No. 103 31 673.6, filed Jul. 14, 2003.

FIELD OF THE INVENTION

The invention relates to electrolyte capacitors having polythiophenes containing alkyleneoxythiathiophene units, to their preparation and to the use of such polythiophenes or dispersions comprising them for producing conductive layers.

BACKGROUND OF THE INVENTION

The compound class of the π-conjugated polymers has been the subject-matter of numerous publications in the last few decades. They are also referred to as conductive polymers or synthetic metals.

Conductive polymers are gaining increasing economic importance, since polymers have advantages over metals with regard to the processability, the weight and the precise adjustment of properties by chemical modification. Examples of known π-conjugated polymers are polypyrroles, polythiophenes, polyanilines, polyacetylenes, polyphenylenes and poly(p-phenylenevinylenes).

A particularly important and industrially utilized polythiophene is poly-3,4-(ethylene-1,2-dioxy)thiophene, often also referred to as poly(3,4-ethylenedioxythiophene), which has very high conductivities in its oxidized form and is described, for example, in EP-A 339 340. A review of numerous poly(alkylenedioxythiophene) derivatives, especially poly-(3,4-ethylenedioxythiophene) derivatives, their monomer building blocks, syntheses and applications is given by L. Groenendaal, F. Jonas, D. Freitag, H. Pielartzik & J. R. Reynolds, Adv. Mater. 12 (2000) 481-494.

The European Patent EP-A 340 512 describes the production of a solid electrolyte from 3,4-ethylene-1,2-dioxythiophene and the use of its cationic polymers, prepared by oxidative polymerization, as a solid electrolyte in electrolyte capacitors. Poly(3,4-ethylenedioxythiophene) as a replacement for manganese dioxide or for charge transfer complexes in solid electrolyte capacitors reduces the equivalent series resistance of the capacitor owing to the higher electrical conductivity and improves the frequency performance.

JP-A 2000-021687 states that the high-frequency performance of electrolyte capacitors can be improved by the use of poly(3,4-ethylenedithiathiophene) as a solid electrolyte. However, 3,4-ethylenedithiathiophene has the disadvantage of difficult preparation (Lit.: C. Wang, J. L. Schindler, C. R. Kannewurf and M. G. Kanatzidis, Chem. Mater. 1995, 7, 58-68). According to this literature method starting from 3,4-dibromothiophene, the synthesis proceeds only with an overall yield of 19%, and process disadvantages such as reaction at −78° C., use of very moisture-sensitive reagents such as n-butyllithium and metallic potassium and also of highly explosive and toxic carbon disulphide have to be accepted. Although 3,4-ethylenedithiathiophene can also be prepared from 3,4-dialkoxythiophenes and 1,2-dimercaptoethane by the principle of transetherification, this also results in extremely highly odorous sulphurous products which very markedly restrict the practicability of this synthetic route and the use of the product. In addition, the investigations of the above literature show that it was possible using 3,4-ethylenedithiathiophene to prepare polythiophenes having only moderate conductivity of 0.1 S/cm (as the tetrachloroferrate) or 0.4 S/cm (as the polymer prepared electrochemically). However, higher conductivities are desirable for a further improvement in the high-frequency performance. In comparison, the following values are obtained for polythiophene composed of ethylenedioxythiophene: 5-31 S/cm (as the tetrachloroferrate), see Lit. F. Jonas, G. Heywang, Electrochimica Acta 39 (8/9), p. 1345-1347 (1994) and 200 S/cm (prepared electrochemically), same literature. The leakage current of electrolyte capacitors having polymeric solid electrolytes is about 10 times higher than in electrolyte capacitors having manganese dioxide as the solid electrolyte (I. Horacek et al., Proceedings of the 15$^{th}$ European Passive Components Symposium CARTS-Europe 2001, Copenhagen, Denmark, p. 24-29). The high current losses lead, for example in mobile electronics applications, to earlier flattening of the battery. It is desirable to reduce leakage current of electrolyte capacitors using polymeric solid electrolytes.

There is therefore a need for suitable electrically conductive polymers which are suitable as solid electrolytes in electrolyte capacitors, with a view to improving the leakage current in comparison to known polymers, for example poly(3,4-ethylenedioxythiophene) and poly(3,4-ethylenedithiathiophene).

It is an object of the invention to provide electrolyte capacitors comprising such electrically conductive polymers as solid electrolytes.

In Org. Lett. 4 (4), 2002, p. 607-609, Roncali et al. describe the preparation of 3,4-ethyleneoxythiathiophene (thieno[3,4-b]-1,4-oxathiane, EOTT) and its electrochemical polymerization to give poly(3,4-ethyleneoxythiathiophene) (PEOTT). Comparison with the corresponding dioxy and dithia analogues shows that the replacement of alkoxy groups by alkylsulphanyl groups on the thiophene ring significantly reduces its polymerization potential. There is no description of conductivity data or investigations with regard to the use of the polymer in capacitors.

SUMMARY OF THE INVENTION

It is all the more surprising that it has now been found that polythiophenes containing 3,4-alkyleneoxythiathiophene units or 3,4-alkyleneoxythiathiophene and 3,4-alkylenedioxythiophene units do not show the disadvantages outlined above and are outstandingly suitable as solid electrolytes in electrolyte capacitors.

In accordance with the present invention there is provided an electrolyte capacitor comprising:

(a) a layer of an oxidizable metal;

(b) an oxide layer of said metal;

(c) a solid electrolyte; and (d) a plurality of contacts (e.g., between said solid electrolyte and said oxide layer), wherein the solid electrolyte comprises polythiophenes having repeating units of the general formula (I) or repeating units of the general formulae (I) and (II),

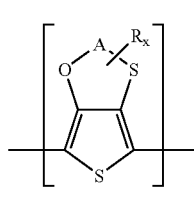
(I)

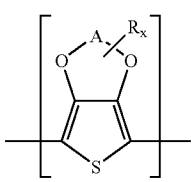
(II)

where
A is an optionally substituted $C_1$-$C_5$-alkylene radical, preferably an optionally substituted $C_2$-$C_3$-alkylene radical,
R is a linear or branched, optionally substituted $C_1$-$C_{18}$-alkyl radical, preferably linear or branched, optionally substituted $C_1$-$C_{14}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical, and
x is an integer from 0 to 8, preferably from 0 to 6, more preferably 0 or 1,
and
in the case that a plurality of R radicals are bonded to A, may be the same or different,
and optionally counterions.

The general formula (I) is to be interpreted in such a way that the substituent R may be bonded x times to the alkylene radical A.

In an embodiment of the present invention, the oxide layer is interposed between the layer of oxidizable metal and a solid electrolyte layer.

DETAILED DESCRIPTION OF THE INVENTION

The repeating units of the general formula (I) are present in the polythiophenes present as the solid electrolyte in the inventive electrolyte capacitor in a proportion of 1 to 100 mol %, preferably in a proportion of 20 to 95 mol %, more preferably in a proportion of 30 to 80 mol %, and the repeating units of the general formula (II) in a proportion of 99 to 0 mol %, preferably in a proportion of 80 to 5 mol %, more preferably in a proportion of 70 to 20 mol %, with the proviso that the sum of the two proportions is 100 mol %.

In a further preferred embodiment, the polythiophenes present as the solid electrolyte in the inventive electrolyte capacitor are the homopolythiophenes composed of repeating units of the general formula (I), i.e. those polythiophenes in which the repeating units of the general formula (I) are present in a proportion of 100 mol %.

The linkage of the monomer building blocks of the formula (I) is to be interpreted in such a way, both in the copolymers and in the homopolymers, that both the regioregular linkage of (I-1)

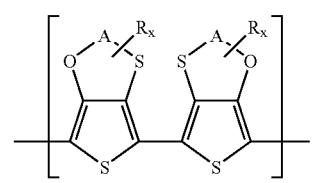
(I-1)

and the linkages of (I-2) and (I-3) may occur, and the proportions of the different linkages in the polythiophene may be the same or different.

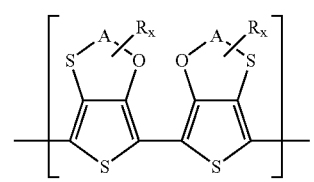
(I-2)

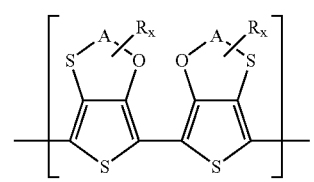
(I-3)

The present invention preferably provides an electrolyte capacitor which comprises, as the solid electrolyte, polythiophenes having repeating units of the general formula (Ia) or of the general formulae (Ia) and (IIa)

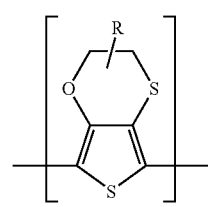
(Ia)

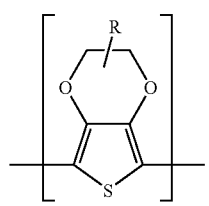
(IIa)

where
R is as defined above for the general formulae (I) and (II).

The electrolyte capacitor is more preferably one which comprises, as the solid electrolyte, polythiophenes having repeating units of the general formula (Iaa) or of the general formulae (Iaa) and (IIaa)

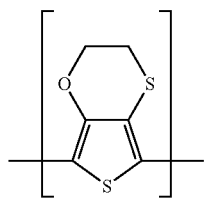

(Iaa)

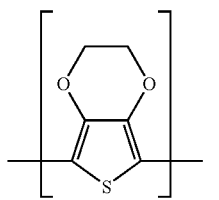

(IIaa)

In the case that the polythiophenes are copolymers of two or more units of the general formulae (I) and (II) (here and hereinbelow, this also includes units of the general formulae (Ia) and (IIa) or (Iaa) and (IIaa)), or of two and more different units of the general formula (I) (here and hereinbelow, this also includes units of the general formulae (Ia) or (Iaa)), they may be present in the copolymer randomly, alternatingly or as blocks, and the units of the general formula (I) may be linked to one another as per (I-1), (I-2) and/or (I-3) and the units of the general formula (I) may be linked to form the units of the general formula (II) as per (I-4), (I-5), (I-6) and/or (I-7)

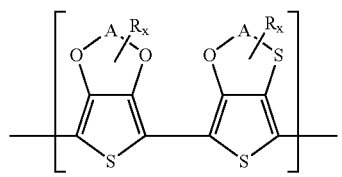

(I-4)

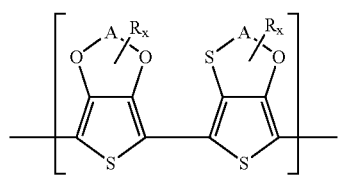

(I-5)

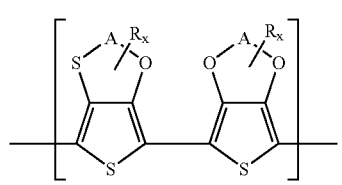

(I-6)

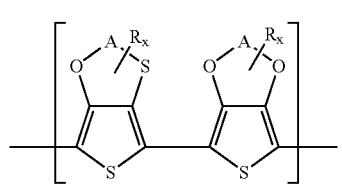

(I-7)

One or more of the linkage possibilities (I-1) to (I-3) and of the linkage possibilities (I-4) to (I-7) may preferably occur in the polythiophenes, but such a preference does not have to occur.

In the context of the invention, the prefix poly- means that more than one identical or different repeating unit is present in the polymer or polythiophene. The polythiophenes preferably contain a total of n repeating units of the general formula (I) or of the general formulae (I) and (II) where n is an integer from 2 to 2000, preferably from 2 to 100. The repeating units of the general formula (I) and/or (II) may each be the same or different within a polythiophene. Preference is given to polythiophenes having in each case identical repeating units of the general formula(e) (I) or (I) and (II).

In preferred embodiments of the present invention, the polythiophenes are copolymers containing repeating units of the general formulae (I) and (II), more preferably (Ia) and (IIa), most preferably (Iaa) and (IIaa).

On the end groups, the polythiophenes preferably each bear H. In the context of the invention, repeating units refer to units of the general formula (I) or (II), (Ia) or (IIa) and (Iaa) or (IIaa), irrespective of whether they are present once or more than once in the polythiophene. In other words, units of the general formula (I) or (II), (Ia) or (IIa) and (Iaa) or (IIaa) are also to be regarded as repeating units when they are present only once in the polythiophene.

In the context of the invention, $C_1$-$C_5$-alkylene radicals A are methylene, ethylene, n-propylene, n-butylene or n-pentylene. In the context of the invention, $C_1$-$C_{18}$-alkyl is a linear or branched $C_1$-$C_{18}$-alkyl radical, for example methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl is a $C_5$-$C_{12}$-cycloalkyl radical, for example cyclopentyl, cyclohexyl, cycloheptyl, cyclooctyl, cyclononyl or cyclodecyl, $C_5$-$C_{14}$-aryl is a $C_5$-$C_{14}$-aryl radical, for example phenyl or naphthyl, and $C_7$-$C_{18}$-aralkyl is a $C_7$-$C_{18}$-aralkyl radical, for example benzyl, o-, m-, p-tolyl, 2,3-, 2,4-, 2,5-, 2,6-, 3,4-, 3,5-xylyl or mesityl. The preceding list serves to illustrate the invention by way of example and is not to be regarded as exclusive.

Any further substituents of the $C_1$-$C_5$-alkylene radicals A include numerous organic groups, for example alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups and also carboxamide groups.

The polythiophenes present as the solid electrolyte in the inventive electrolyte capacitors may be neutral or cationic. In preferred embodiments, they are cationic, "cationic" referring only to the charges that reside on the polythiophene main chain. Depending on the substituent on the R radicals, the polythiophenes may bear positive and negative charges in the structural unit, and the positive charges on the polythiophene main chain and the negative charges may optionally be disposed on the R radicals substituted by sulphonate or carboxylate groups. Some or all of the positive charges of the polythiophene main chain may be neutralised by any anionic groups present on the R radicals. Viewed overall, the polythiophenes in these cases may be cationic, neutral or even anionic. Nevertheless, they are all viewed as cationic polythiophenes in the context of the invention, since the positive charges on the polythiophene main chain are crucial. The positive charges are not shown in the formulae, since their precise number and position cannot be determined unambiguously. However, the number of positive charges is at least 1 and at most n, where n is the total number of all repeating units (identical or different) within the polythiophene.

To compensate the positive charge, when this is not already done by any sulphonate- or carboxylate-substituted and thus negatively charged R radicals, the cationic polythiophenes need anions as counterions.

Useful counterions include monomeric or polymeric anions, the latter also being referred to hereinbelow as polyanions.

Polymeric anions may be, for example, anions of polymeric carboxylic acids such as polyacrylic acids, polymethacrylic acid or polymaleic acids, or polymeric sulphonic acids such as polystyrenesulphonic acids and polyvinylsulphonic acids. These polycarboxylic and polysulphonic acids may also be copolymers of vinylcarboxylic and vinylsulphonic acids with other polymerizable monomers such as acrylic esters and styrene.

A particularly preferred polymeric anion is the anion of polystyrenesulphonic acid (PSS) as a counterion.

The molecular weight of the polyacids affording the polyanions is preferably 1000 to 2 000 000, more preferably 2000 to 500 000. The polyacids or their alkali metal salts are commercially available, for example polystyrenesulphonic acids and polyacrylic acids, or else preparable by known processes (see, for example, Houben Weyl, Methoden der organischen Chemie, vol. E 20 Makromolekulare Stoffe, part 2, (1987), p. 1141 ff.).

Preference is given to monomeric anions for use in the inventive electrolyte capacitors.

Useful monomeric anions are, for example, those of $C_1$-$C_{20}$-alkanesulphonic acids such as methanesulphonic acid, ethanesulphonic acid, propanesulphonic acid, butanesulphonic acid or higher sulphonic acids such as dodecanesulphonic acid, of aliphatic perfluorosulphonic acids such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids such as camphorsulphonic acid, or tetrafluoroborates, hexafluorophosphates, perchlorates, hexafluoroantimonates, hexafluoroarsenates or hexachloroantimonates.

Particular preference is given to the anions of p-toluenesulphonic acid, methanesulphonic acid or camphorsulphonic acid.

Cationic polythiophenes that contain anions as counterions for charge compensation are also often referred to in the technical field as polythiophene/(poly)anion complexes.

The present invention preferably further provides an electrolyte capacitor, characterized in that the oxidizable metal is a valve metal or a compound having comparable properties.

In the context of the invention, valve metal refers to those metals whose oxide layers do not enable current flow in both directions: in the case of anodically applied voltage, the oxide layers of the valve metals block the current flow, while cathodically applied voltage leads to large currents that can destroy the oxide layer. The valve metals include Be, Mg, Al, Ge, Si, Sn, Sb, Bi, Ti, Zr, Hf, V, Nb, Ta and W, and also an alloy or compound of at least one of these metals with other elements. The most familiar representatives of the valve metals are Al, Ta and Nb. Compounds having comparable properties are those having metallic conductivity which are oxidizable and whose oxide layers have the above-described properties. For example NbO has metallic conductivity, but is generally not regarded as a valve metal. However, layers of oxidized NbO have the typical properties of valve metal oxide layers, so that NbO or an alloy or compound of NbO with other elements are typical examples of such compounds having comparable properties.

Accordingly, the term "oxidizable metal" means not only metals, but also an alloy or compound of a metal with other elements, as long as they have metallic conductivity and are oxidizable.

The present invention accordingly more preferably provides an electrolyte capacitor, characterized in that the valve metal or the compound having comparable properties is tantalum, niobium, aluminium, titanium, zirconium, hafnium, vanadium, an alloy or compound of at least one of these metals with other elements, NbO or an alloy or compound of NbO with other elements.

In the inventive electrolyte capacitor, the "oxidizable metal" preferably forms an anode body with large surface area, for example in the form of a porous sintered body or of a roughened foil. This is also referred to for short hereinbelow as an anode body.

In principle, such an inventive electrolyte capacitor is produced initially by oxidatively coating the anode body, for example by electrochemical oxidation, with a dielectric, i.e. an oxide layer. On the dielectric, the conductive polymer, according to the invention a polythiophene containing repeating units of the general formula(e) (I) or (I) and (II), is then deposited chemically or electrochemically by means of oxidative polymerization, and forms the solid electrolyte. A coating with further layers having good conductivity, such as graphite and silver, serves to conduct the current away. Finally, the capacitor body is contacted and encapsulated.

The polythiophenes are formed on the anode body covered with an oxide layer by oxidative polymerization of thiophenes of the general formula (III) or of a mixture of thiophenes of the general formulae (III) and (IV)

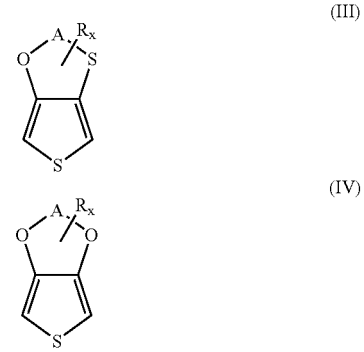

where

A, R and x are each as defined above for the general formulae (I) and (II), by applying the thiophenes of the general formula(e) (III) or (III) and (IV), oxidizing agents and optionally counterions, preferably in the form of solutions, either separately in succession or together, to the oxide layer of the anode body, and conducting the oxidative polymerization to completion, if appropriate by heating the coating, depending on the activity of the oxidizing agent used.

The present invention thus further provides a process for producing an inventive electrolyte capacitor, by which thiophenes of the general formula (III) or a mixture of thiophenes of the general formulae (III) and (IV)

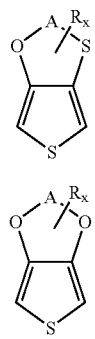

(III)

(IV)

where
A, R and x are each as defined above for the general formulae (I) and (II), an oxidizing agent and optionally counterions are applied, together or successively, to an oxide layer of a metal, optionally in the form of solutions, and polymerized at temperatures of −10° C. to 250° C., preferably at 0° C. to 200° C., in a chemically oxidative manner to give the polythiophenes having repeating units of the general formula (I) or repeating units of the general formulae (I) and (II)

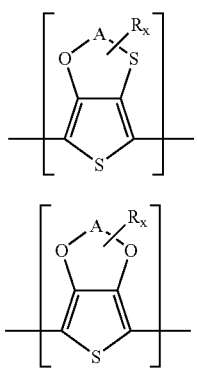

(I)

(II)

where
A, R and x are each as defined above or
thiophenes of the general formula (III) or a mixture of thiophenes of the general formulae (III) and (IV) and counterions are applied to the oxide layer of a metal at temperatures of −78° C. to 250° C., preferably −20° C. to 60° C., optionally from solution, by electrochemical polymerization to give the polythiophenes having repeating units of the general formula (I) or repeating units of the general formulae (I) and (II).

The application to the oxide layer of the anode body may be effected directly or using an adhesion promoter, for example a silane, and/or another functional layer.

In preferred embodiments of the process according to the invention, the thiophenes of the general formula (III) used or a mixture of thiophenes of the general formulae (III) and (IV) used are thiophenes of the general formula (IIIa) or a mixture of thiophenes of the general formulae (IIIa) and (IVa)

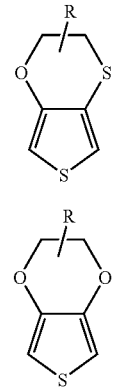

(IIIa)

(IVa)

where
R is as defined above for the general formulae (I) and (II), more preferably thiophenes of the general formula (IIIaa) or a mixture of thiophenes of the general formulae (IIIaa) and (IVaa)

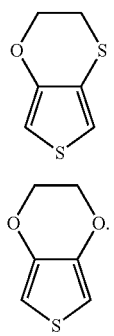

(IIIaa)

(IVaa)

The oxidative chemical polymerization of the thiophenes of the formula(e) (III) or (III) and (IV) is undertaken, depending on the oxidizing agent used and the desired reaction time, generally at temperatures of −10° C. to 250° C., preferably at temperatures of 0° C. to 200° C.

In the case that mixtures of thiophenes of the general formulae (III) and (IV) are polymerized by the process according to the invention, there may be any molar ratio of the thiophenes of the general formulae (III) and (IV) in the mixtures. The molar ratio of the repeating units (I) and (II) in the resulting polythiophene may correspond to this mixing ratio of the thiophenes of the general formulae (III) and (IV) in the mixtures to be polymerized or may differ from it.

The 3,4-alkyleneoxythiathiophenes of the formula (III) or (IV) required for the preparation of the polythiophenes to be used in accordance with the invention are known to those skilled in the art or can be prepared by known processes (for example according to P. Blanchard, A. Cappon, E. Levillain, Y. Nicolas, P. Frère and J. Roncali, Org. Lett. 4 (4), 2002, p. 607-609).

Useful solvents for the thiophenes of the general formula (III) or (IV) and/or oxidizing agents and/or counterions include in particular the following organic solvents which are inert under the reaction conditions: aliphatic alcohols such as methanol, ethanol, isopropanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulphoxides and sulphones such as dimethyl sulphoxide and sulpholane; aliphatic carboxamides such as methylacetamide, dimethylacetamide and dimethylformamide; aliphatic and araliphatic ethers such as diethyl ether and anisole. In addition, water or a mixture of water with the aforementioned organic solvents may also be used as the solvent.

The oxidizing agents used may be any metal salts known to those skilled in the art suitable for the oxidative polymerization of thiophenes, anilines or pyrroles.

Suitable metal salts are metal salts of main group or transition group metals, the latter also referred to hereinbelow as transition metal salts, of the periodic table of the elements. Suitable transition metal salts are in particular salts of an inorganic or organic acid or inorganic acid, having organic radicals, of transition metals, for example of iron(III), copper(II), chromium(VI), cerium(IV), manganese (IV), manganese(VII) and ruthenium(III).

Preferred transition metal salts are those of iron(III). Iron(III) salts are frequently inexpensive, readily available and can be easily handled, for example the iron(III) salts of inorganic acids, for example iron(III) halides (e.g. $FeCl_3$) or iron(III) salts of other inorganic acids such as $Fe(ClO_4)_3$ or $Fe_2(SO_4)_3$, and the iron(III) salts of organic acids and inorganic acids having organic radicals.

Iron(III) salts of inorganic acids having organic radicals include, for example, the iron(III) salts of sulphuric monoesters of $C_1$-$C_{20}$-alkanols, for example the iron(III) salt of lauryl sulphate.

Particularly preferred transition metal salts are those of an organic acid, in particular iron(III) salts of organic acids.

Examples of iron(III) salts of organic acids include: the iron(III) salts of $C_1$-$C_{20}$-alkanesulphonic acids such as methanesulphonic acid, ethanesulphonic acid, propanesulphonic acid, butanesulphonic acid or higher sulphonic acids such as dodecanesulphonic acid, of aliphatic perfluorosulphonic acids such as trifluoromethanesulphonic acid, of perfluorobutanesulphonic acid or of perfluorooctanesulphonic acid, of aliphatic $C_1$-$C_{20}$-carboxylic acids such as 2-ethylhexylcarboxylic acid, of aliphatic perfluorocarboxylic acids such as of trifluoroacetic acid or of perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or of dodecylbenzenesulphonic acid and of cycloalkanesulphonic acids such as camphorsulphonic acid.

It is also possible to use any mixtures of these aforementioned iron(III) salts of organic acids.

The use of iron(III) salts of organic acids and of inorganic acids having organic radicals has the great advantage that they are not corrosive.

Very particularly preferred metal salts are iron(III) p-toluenesulphonate, iron(III) o-toluenesulphonate or a mixture of iron(III) p-toluenesulphonate and iron(III) o-toluenesulphonate.

In preferred embodiments, the metal salts have been treated before use with an ion exchanger, preferably a basic anion exchanger. Examples of suitable ion exchangers are macroporous polymers composed of styrene and divinylbenzene which have been functionalized with tertiary amines, as sold, for example, under the trade name Lewatit® by Bayer AG, Leverkusen, Germany.

Further suitable oxidizing agents are peroxo compounds such as peroxodisulphates (persulphates), especially ammonium peroxodisulphates and alkali metal peroxodisulphates such as sodium peroxodisulphate and potassium peroxodisulphate, or alkali metal perborates, optionally in the presence of catalytic amounts of metal ions such as iron, cobalt, nickel, molybdenum or vanadium ions, and also transition metal oxides, for example manganese(IV) oxide or cerium (IV) oxide.

For the oxidative polymerization of thiophenes of the formula (III) or (IV), 2.25 equivalents of oxidizing agent are theoretically required per mole of thiophene (see, for example, J. Polym. Sc. Part A Polymer Chemistry Vol. 26, p. 1287 (1988)). However, it is also possible to use lower or higher equivalents of oxidizing agent. In the context of the invention, preference is given to using one equivalent or more, particular preference to using 2 equivalents or more, of oxidizing agent per mole of thiophene.

The formulation of thiophenes of the general formula (III) or mixtures of thiophenes of the general formulae (III) and (IV) is also expressed hereinbelow, abbreviated but with the same meaning, as thiophenes of the general formula(e) (III) or (III) and (IV).

Useful counterions are the polymeric or monomeric anions already specified above.

In the case of separate application of thiophenes of the general formula(e) (III) or (III) and (IV), oxidizing agents and optionally counterions, the oxide layer of the anode body is preferably initially coated with the solution of the oxidizing agent and optionally of the counterions and subsequently with the solution of the thiophenes of the general formula(e) (III) or (III) and (IV). In the case of the preferred combined application of thiophenes, oxidizing agent and optionally counterions, the oxide layer of the anode body is coated only with one solution, i.e. containing thiophenes, oxidizing agent and optionally counterions.

It is also possible to add further components to the solutions, such as one or more organic binders soluble in organic solvents, such as polyvinyl acetate, polycarbonate, polyvinylbutyral, polyacrylic esters, polymethacrylic esters, polystyrene, polyacrylonitrile, polyvinyl chloride, polybutadiene, polyisoprene, polyethers, polyesters, silicones, styrene/acrylic ester copolymers, vinyl acetate/acrylic ester copolymers and ethylene/vinyl acetate copolymers, or water-soluble binders such as polyvinyl alcohols, crosslinkers such as polyurethanes or polyurethane dispersions, polyacrylates, polyolefin dispersions, epoxysilanes such as 3-glycidoxypropyltrialkoxysilane, and/or additives, for example surface-active substances. In addition, alkoxysilane hydrolysates, for example based on tetraethoxysilane, may be added to increase the scratch resistance in coatings.

The solutions to be applied to the oxide layer of the anode body preferably contain from 1 to 30% by weight of the thiophene of the general formula (III) or of the mixture of thiophenes of the general formulae (III) and (IV) and from 0 to 50% by weight of binder, crosslinker and/or additives, both percentages by weight based on the total weight of the mixture.

The solutions are applied to the oxide layer of the anode body by known processes, for example by impregnation, casting, drop application, squirting, spray application, knife-coating, painting or printing.

The solvent can be removed after application of the solutions by simply evaporating off at room temperature. However, to achieve higher processing rates, it is more advantageous to remove the solvents at elevated temperatures, for example at temperatures of 20 up to 300° C., preferably 40 up to 250° C. A thermal aftertreatment may be associated directly with the removal of the solvent or else undertaken offset in time from the completion of the coating.

Depending on the type of the polymer used for the coating, the duration of the heat treatment is typically 5 seconds to several hours. For the thermal treatment, temperature profiles having different temperatures and delay times may be used.

The heat treatment may be performed, for example, in such a way that the coated anode bodies are moved through a heat chamber at the desired temperature at such a rate that the desired delay time at the selected temperature is achieved, or contacted with a hot plate at the desired temperature for the desired delay time. In addition, the heat treatment may be effected, for example, in a furnace or several furnaces, each having different temperatures.

After the removal of the solvent (drying) and optionally after the thermal aftertreatment, it may be advantageous to wash out excess oxidizing agent and residual salts from the coating using a suitable solvent, preferably water or alcohols. Residual salts here refer to the salts of the reduced form of the oxidizing agent and any further salts present.

Depending on the type of the anode body, it may be advantageous to impregnate the anode body, preferably after a washing, repeatedly with the mixtures in order to achieve thicker polymer layers.

After the polymerization and preferably during or after the washing, it may be advantageous to electrochemically reform the oxide film in order to correct any defects in the oxide film and thus reduce the leakage current of the finished capacitor (reformation). The term "reformation" is known to those skilled in the art.

The polythiophenes may also be prepared from the thiophenes of the general formula (III) or mixtures of the thiophenes of the general formulae (III) and (IV) by electrochemical oxidative polymerisation.

The electrochemical oxidative polymerization of the thiophenes of the general formula (III) or of the mixture of thiophenes of the general formulae (III) and (IV) may be undertaken at temperatures of −78° C. up to the boiling point of the solvent used. Preference is given to electrochemically polymerizing at temperatures of −78° C. to 250° C., more preferably of −20° C. to 60° C.

Depending on the thiophene or thiophene mixture used, the electrolyte used, the temperature selected and the current density applied, the reaction times are preferably 1 minute to 24 hours.

When the thiophenes of the general formula (III) or the mixture of thiophenes of the general formulae (III) and (IV) are liquid, the electropolymerization may be undertaken in the presence or absence of solvents which are inert under the conditions of the electropolymerization; the electropolymerization of solid thiophenes of the general formula (III) or mixtures of thiophenes of the general formulae (III) and (IV) is carried out in the presence of solvents which are inert under the conditions of the electrochemical polymerization. In certain cases, it may be advantageous to use solvent mixtures and/or to add solubilizers (detergents) to the solvents.

Examples of solvents which are inert under the conditions of the electropolymerization include: water; alcohols such as methanol and ethanol; ketones such as acetophenone; halogenated hydrocarbons such as methylene chloride, chloroform, carbon tetrachloride and fluorohydrocarbons; esters such as ethyl acetate and butyl acetate; carbonic esters such as propylene carbonate; aromatic hydrocarbons such as benzene, toluene, xylene; aliphatic hydrocarbons such as pentane, hexane, heptane and cyclohexane; nitriles such as acetonitrile and benzonitrile; sulphoxides such as dimethyl sulphoxide; sulphones such as dimethyl sulphone, phenyl methyl sulphone and sulpholane; liquid aliphatic amides such as methyl acetamide, dimethyl acetamide, dimethylformamide, pyrrolidone, N-methylpyrrolidone, N-methylcaprolactam; aliphatic and mixed aliphatic-aromatic ethers such as diethyl ether and anisole; liquid ureas such as tetramethylurea or N,N-dimethylimidazolidinone.

For the electropolymerization, the thiophenes of the general formula (III) or the mixture of thiophenes of the general formulae (III) and (IV) or solutions thereof are admixed with electrolyte additives. The electrolyte additives used are preferably free acids or customary conductive salts that have a certain solubility in the solvents used. Examples of useful electrolyte additives have been found to be: free acids such as p-toluenesulphonic acid, methanesulphonic acid, and also salts having alkanesulphonate anions, aromatic sulphonate anions, tetrafluoroborate anions, hexafluorophosphate anions, perchlorate anions, hexafluoroantimonate anions, hexafluoroarsenate anions and hexachloroantimonate anions, and alkali metal cations, alkaline earth metal cations or optionally alkylated ammonium cations, phosphonium cations, sulphonium cations and oxonium cations.

The concentrations of the monomeric thiophenes of the general formula(e) (III) or (III) and (IV) may be between 0.01 and 100% by weight (100% by weight only in the case of liquid thiophene); the concentrations are preferably 0.1 to 20% by weight.

The electropolymerization may be carried out batchwise or continuously. The current densities for the electropolymerization may vary within wide limits; it is customary to work with current densities of 0.0001 to 100 mA/cm$^2$, preferably 0.01 to 40 mA/cm$^2$. At these current densities, voltages of about 0.1 to 50 V are established.

After the electrochemical polymerization, it may be advantageous to electrochemically reform the oxide film in order to correct any defects in the oxide film and thus reduce the leakage current of the finished capacitor (reformation).

Suitable counterions are the monomeric or polymeric anions already listed above, preferably those of the monomeric or polymeric alkane- or cycloalkanesulphonic acids or aromatic sulphonic acids. Particularly preferred for use in the inventive electrolyte capacitors are the anions of the monomeric alkane- or cycloalkanesulphonic acids or aromatic sulphonic acids, since solutions comprising them are better suitable for penetrating into the porous anode material and thus forming a greater contact surface between it and the solid electrolyte. The counterions are added to the solutions, for example, in the form of their alkali metal salts or as free acids. In the electrochemical polymerization, these counterions are added to the solution or to the thiophenes optionally as electrolyte additives or conductive salts.

The counterions used may also be any anions of the oxidizing agent used that are present, so that it is not necessarily obligatory to add additional counterions in the case of the chemical oxidative polymerization.

The present invention further provides the use of polythiophenes having repeating units of the general formula (I) or repeating units of the general formulae (I) and (II)

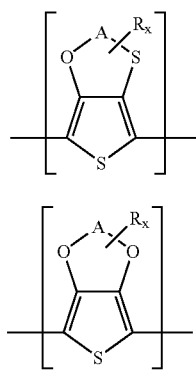

(I)

(II)

where

A, R and x are each as defined above as solid electrolytes in electrolyte capacitors, preferably in those that contain, as an oxidizable metal, a valve metal or a compound having comparable properties, which are more preferably tantalum, niobium, aluminium, titanium, zirconium, hafnium, vanadium, an alloy or compound of at least one of these metals with other elements, NbO or an alloy or compound of NbO with other elements.

The inventive use of the polythiophenes having repeating units of the general formula (I) as solid electrolytes in electrolyte capacitors offers the advantage over existing solid electrolytes such as poly(3,4-ethylenedioxythiophene) that the leakage current of the capacitors is distinctly reduced and the equivalent series resistance is lowered. The lower equivalent series resistance results in better high-frequency performance of the capacitor.

The polythiophenes having repeating units of the general formula (I) or repeating units of the general formulae (I) and (II) are also suitable for producing conductive layers for other applications, for example for producing antistatic coatings, hole injection layers for OLEDs (organic light-emitting diodes), conductive layers for OFETs (organic field-effect transistors), electrodes for capacitors, electrolyte capacitors, double-layer capacitors, electrochemical capacitors, batteries, fuel cells, solar cells, sensors and as actuators.

The present invention therefore further provides electrically conductive layers which comprise polythiophenes having repeating units of the general formula (I) or repeating units of the general formulae (I) and (II)

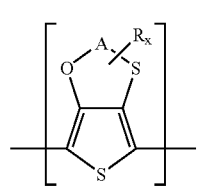

(I)

-continued

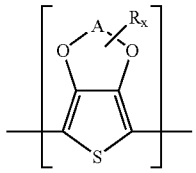

(II)

where

A, R and x are each as defined above and monomeric anions, except hexafluorophosphate, or polymeric anions as counterions.

Depending on the application, the inventive polythiophene layers have a thickness of 1 nm to 100 μm, preferably 10 nm to 10 μm, more preferably 50 nm to 1 μm.

The inventive conductive layers can be produced in a simple manner by oxidative polymerization.

The present invention therefore likewise provides a process for producing electrically conductive layers, characterized in that thiophenes of the general formula (III) or a mixture of thiophenes of the general formulae (III) and (IV)

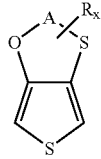

(III)

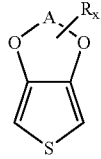

(IV)

where

A, R and x are each as defined above for the general formulae (I) and (II)

an oxidizing agent and optionally counterions are applied, together or successively, to a substrate, optionally in the form of solutions, and polymerized at temperatures of −10° C. to 250° C., preferably of 0° C. to 200° C., in a chemically oxidative manner to give the polythiophenes having repeating units of the general formula (I) or repeating units of the general formulae (I) and (II)

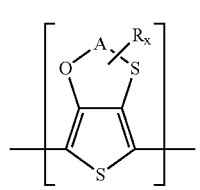

(I)

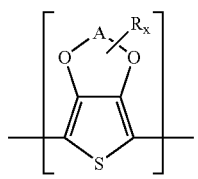

where
A, R and x are each as defined above.

The inventive conductive layers may also be produced in an electrochemical oxidative manner by applying thiophenes of the general formula (III) or a mixture of thiophenes of the general formulae (III) and (IV) and counterions, optionally from solution, to a substrate by electrochemical polymerization to give the polythiophenes having repeating units of the general formula (I) or repeating units of the general formulae (I) and (II), at temperatures of −78° C. to 250° C., preferably of −20° C. to 60° C.

Exemplary and preferred reaction conditions, molar ratios, percentages by weight, solvents, oxidizing agents and conductive salts, and also variants described in connection with them and particular features in carrying out the chemical or electrochemical oxidative polymerization and any advantageous aftertreatments correspond to those already described above for the preparation of the polythiophenes as solid electrolytes in the inventive electrolyte capacitors.

Polymeric anions refer to those already mentioned above for the inventive polythiophenes; monomeric anions refer to those already mentioned above for the inventive electrolyte capacitors, except hexafluorophosphate. Preference is given to the monomeric anions of organic carboxylic or sulphonic acids, for example those of $C_1$-$C_{20}$-alkanesulphonic acids, of aliphatic perfluorosulphonic acids, of aliphatic $C_1$-$C_{20}$-carboxylic acids, of aliphatic perfluorocarboxylic acids, of aromatic sulphonic acids optionally substituted by $C_1$-$C_{20}$-alkyl groups and of cycloalkanesulphonic acids. The polymeric anions are preferred as counterions for the inventive conductive layers, since they can lead to improved film formation properties in the formation of polymer films.

The substrate may be, for example, glass, ultrathin glass (flexible glass) or plastics, which, in the case of electrochemical polymerization, are provided with a conductive layer (electrode).

Particularly suitable plastics are: polycarbonates, polyesters, e.g. PET and PEN (polyethylene terephthalate or polyethylene naphthalate), copolycarbonates, polysulphone, polyethersulphone (PES), polyimide, polyethylene, polypropylene or cyclic polyolefins or cyclic olefin copolymers (COC), hydrogenated styrene polymers or hydrogenated styrene copolymers.

Suitable polymer substrates may be, for example, films such as polyester films, PES films from Sumitomo or polycarbonate films from Bayer AG (Makrofol®). The conductive layers produced in accordance with the invention may remain on the substrate or be removed therefrom.

The inventive conductive layers have the advantage that their conductivity can be adjusted by the selection of the monomer composition.

The specific conductivity of the inventive layers may be different depending on the application. For example, for high-ohm applications such as antistatic coatings, surface resistances of $10^5$ to $10^{10}$ ohm/sq are preferred, and for OLEDs, specific conductivities of $10^{-2}$ S/cm to $10^{-6}$ S/cm. For other applications, for example capacitors, layers having a specific conductivity of at least 1 S/cm, preferably at least 10 S/cm, more preferably at least 100 S/cm, are preferred in the context of the invention.

The inventive conductive layers may advantageously be transparent.

In addition to the above-described production of the inventive conductive layers by in situ polymerization on the desired substrate, the inventive layers may also be produced from finished polythiophene dispersions. Such an application from solution may be advantageous for the above-listed uses, since any complicated process steps in the production of the end products, such as OLEDs, OFETs, capacitors, batteries, fuel cells, solar cells, sensors and actuators, may be dispensed with. To this end, dispersions comprising polythiophenes may be prepared in cationic form.

The present invention therefore further provides dispersions containing cationic polythiophenes, having repeating units of the general formula (I) or repeating units of the general formulae (I) and (II)

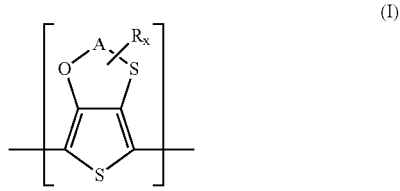

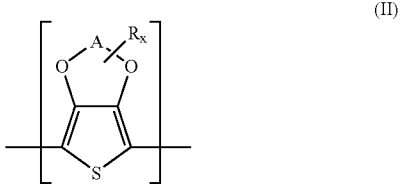

where
A, R and x are each as defined above,
polymeric anions as counterions and one or more solvents.

Useful solvents are those already specified above for the preparation of the polythiophenes used as solid electrolytes in the inventive electrolyte capacitors.

Preferred solvents are water or other protic solvents such as alcohols, e.g. methanol, ethanol, isopropanol and butanol, and also mixtures of water with these alcohols; a particularly preferred solvent is water.

Useful polymeric anions are those already listed above. Preferred polymeric anions are those of polystyrenesulphonic acid.

The inventive dispersions may be obtained directly by preparing the polythiophenes in the presence of at least one solvent.

The present invention therefore further provides a process for producing the inventive dispersions, by which thiophenes of the general formula (III) or a mixture of thiophenes of the general formulae (III) and (IV)

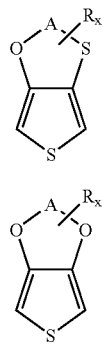

(III)

(IV)

where
A, R and x are each as defined above
are oxidatively polymerized in the presence of one or more oxidizing agents, of one or more solvents and of polymeric anions or of the corresponding polymeric acids.

The inventive dispersions are prepared from thiophenes of the general formula (III) or a mixture of thiophenes of the general formulae (III) and (IV) in a similar manner to the conditions specified in EP-A 440 957.

Useful oxidizing agents, solvents and anions are those already listed above.

The anions or their corresponding acids are preferably used in such an amount that, for 1 mol of thiophene of the general formula(e) (III) or (III) and (IV), 0.25 to 20, more preferably 0.25 to 10, most preferably 0.8 to 8, anionic groups or acid groups are used.

The thiophenes of the general formula(e) (III) or (III) and (IV) and the anions or their corresponding acids are preferably dissolved in such an amount of solvent that stable dispersions are obtained that have a solids content of 0.5 to 55% by weight, preferably 1 to 30% by weight, based on the total weight of the dispersion.

Further suitable oxidizing agents for producing the inventive dispersions are oxygen or air alone or optionally in combination with one of the above-described oxidizing agents. When air or oxygen is used as the oxidizing agent, air or oxygen is introduced into the solution comprising thiophenes, anions or their corresponding acids until the polymerization is complete. Optionally, catalytic amounts of metal ions such as iron, cobalt, nickel, molybdenum or vanadium ions may additionally be present in the polymerization solutions.

However, the inventive dispersions may also be produced from the polythiophenes having repeating units of the general formula (I) or repeating units of the general formulae (I) and (II), by subsequent addition of one or more solvents.

The present invention further provides polythiophenes, characterized in that they contain repeating units of the general formulae (I) and (II)

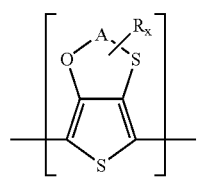

(I)

-continued

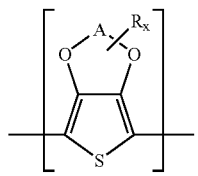

(II)

where
A, R and x are each as defined above,
in the case that a plurality of R radicals are bonded to A, they may be the same or different,
containing repeating units of the general formula (I) in a proportion of 1 to 100 mol %, preferably in a proportion of 20 to 95 mol %, more preferably in a proportion of 30 to 80 mol %, and repeating units of the general formula (II) in a proportion of 99 to 0 mol %, preferably in a proportion of 80 to 5 mol %, more preferably in a proportion of 70 to 20 mol %, with the proviso that the sum of the two proportions is 100 mol %, and, in the case that they are cationic, the polythiophenes contain polymeric anions as counterions.

Areas of preference for the inventive polythiophenes are any combination of those which have already been described above for the polythiophenes as solid electrolytes in the inventive electrolyte capacitors. Useful monomeric anions of organic carboxylic or sulphonic acids or polymeric anions are those already mentioned above.

The inventive polythiophenes may be prepared in an oxidative chemical or electrochemical manner as described above. They may, prepared in situ or in the form of the inventive dispersions be used, for example, to produce antistatic coatings, hole injection layers for OLEDs (organic light-emitting diodes), conductive layers for OFETs (organic field-effect transistors), solid electrolytes in electrolyte capacitors or electrodes for capacitors, electrolyte capacitors, double-layer capacitors, electrochemical capacitors, batteries, fuel cells, solar cells, sensors and actuators.

Their particular advantage is that the selection of the monomer composition allows the conductivity of the resultant layers to be adjusted. Especially for relatively high-ohm adjustments, this may allow the otherwise necessary measures associated with other disadvantages to be dispensed with, for example the additional application of PSS or other non-intrinsically conductive and thus conductivity-reducing additives, or complicated fine and ultrafine dispersion, which causes a reduction in conductivity as a result of an increase in the particle interfaces relevant to electrical resistance.

The present invention likewise provides the use of the inventive polythiophenes or dispersions for producing conductive layers or electrolyte capacitors.

The examples which follow serve to illustrate the invention by way of example and are not to be interpreted as a restriction.

EXAMPLES

Example 1

Preparation of 3,4-ethyleneoxythiathiophene (thieno[3,4-b]-1,4-oxathiane)

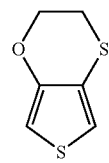

32.31 g (187.6 mmol) of 3,4-diethoxythiophene, 29.31 g (375.2 mmol) of 2-mercaptoethanol and 3.56 g (18.7 mmol) of p-toluenesulphonic acid monohydrate were heated to reflux under an $N_2$ atmosphere in 400 ml of toluene for 5 h. In this time, toluene and ethanol formed were removed continuously and replaced by fresh toluene. Afterwards, the reaction was complete according to thin-film chromatography monitoring. The reaction mixture was filtered after cooling to room temperature (23° C.) and washed to neutrality with water. After drying over sodium sulphate, the mixture was distilled at 0.07 mbar (b.p. 59-62° C.) and the distillate was further purified by column chromatography on silica gel (eluent: toluene).

Yield: 15.99 g of thieno[3,4-b]-1,4-oxathiane (=53.9% of theory) as a virtually colourless oil $^1$H-NMR (400 MHz) δ(CDCl$_3$, ppm): 6.72 (d, 1H, J=3.55 Hz), 6.46 (d, 1H, J=3.55 Hz), 4.37 (m, 2H), 3.00 (m, 2H).

Example 2

Preparation of methyl-3,4-ethylenedioxythiathiophene (2-methylthieno[3,4-b]-1,4-oxathiane)

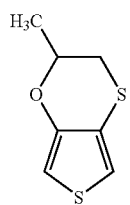

11.68 g (67.8 mmol) of 3,4-diethoxythiophene, 12.5 g (135.6 mmol) of 1-mercapto-2-propanol and 1.29 g (6.8 mmol) of p-toluenesulphonic acid monohydrate were heated to reflux under an $N_2$ atmosphere in 200 ml of toluene for 10 h. The further workup was as described in Example 1.

Yield: 4.06 g of 2-methylthieno[3,4-b]-1,4-oxathiane (=34.8% of theory) as a yellowish oil $^1$H-NMR (400 MHz) δ(CDCl$_3$, ppm): 6.72 (d, 1H, J=3.54 Hz), 6.44 (d, 1H, J=3.54 Hz), 4.33 (q and X part of ABX, 1H, $J_{X,CH3}$=6.2 Hz, $J_{AX}$=1.9 Hz, $J_{BX}$=9.0 Hz), 2.89 (B part of ABX, 1H, $J_{AB}$=13.1 Hz), 2.83 (A part of ABX, 1H, $J_{AB}$=13.1 Hz), 1.45 (d, 3H, $J_{X,CH3}$=6.2 Hz).

From a second, contaminated fraction, a further approx. 1.5 g of pure product could be obtained by column chromatography, overall pure yield 47.6% of theory.

Example 3 (Inventive)

Production of Inventive Capacitors Using poly(3,4-ethyleneoxythiathiophene) as the Solid Electrolyte Tantalum powder having a specific capacity of 50 000 μFV/g was compressed to pellets and sintered in order to form a porous body having the dimensions 4 mm*3 mm*1.5 mm. The pellets (anodes) were anodized to 30 V in a phosphoric acid electrolyte.

A solution consisting of one part by weight of 3,4-ethyleneoxythiathiophene (thieno[3,4-b]-1,4-oxathiane from Example 1) and 20 parts by weight of a 40% by weight solution of iron(III) p-toluenesulphonate in ethanol (Baytron® C-E, H.C. Starck GmbH) was prepared.

The solution was used to impregnate the anode pellets. The anode pellets were impregnated in this solution and subsequently dried at room temperature for 30 min, at 50° C. for 15 min and at 150° C. for 15 min. After the heat treatment, the solution was polymerized in the pellets. Subsequently, the pellets were washed in water for 30 min. After the washing, the pellets were reformed at a voltage of 25 V in an aqueous 0.25 percent by weight solution of p-toluenesulphonic acid for 30 min. The impregnation, washing and reformation described were carried out once more. Finally, the pellets were coated with a silver layer.

For Comparison, Capacitors were Produced Using poly(3,4-ethylenedioxythiophene) as the Solid Electrolyte:

To this end, pellets were produced as described above. A solution consisting of one part by weight of 3,4-ethylenedioxythiophene (Baytron® M, H.C. Starck GmbH) and 20 parts by weight of a 40% by weight solution of iron(III) p-toluenesulphonate in ethanol (Baytron® C-E, H.C. Starck GmbH) was produced. The pellets were impregnated as above, but a total of three impregnations were carried out.

The capacitors had the following electrical values:

|  | Inventive with poly(3,4-ethyleneoxythiathiophene) | with poly(3,4-ethylenedioxythiophene) |
| --- | --- | --- |
| Capacitance [μF] | 126 | 130 |
| Equivalent series resistance [mΩ] | 63 | 122 |
| Leakage current [μA] | 1.2 | 18.9 |

The capacitance was determined at 120 Hz and the equivalent series resistance at 100 kHz by means of an LCR meter (Agilent 4284A). The leakage current was determined three minutes after applying a 10 V voltage using a Keithley 199 multimeter.

The inventive capacitors, even after only two impregnations, have the same capacitance as the capacitors having poly(3,4-ethylenedioxythiophene) and can consequently be produced in fewer process steps. However, they have a distinctly lower equivalent series resistance and a leakage current smaller by one order of magnitude.

Example 4 (Inventive)

Preparation of an Inventive Conductive Layer Comprising poly(3,4-ethyleneoxythiathiophene) by Chemical in situ Polymerization with Fe(III)tosylate 1.11 parts by weight of 3,4-ethyleneoxythiathiophene from Example 1, 25 parts by weight of a 40% solution of iron(III) tosylate in n-butanol (Baytron® C-B 40, H. C. Starck GmbH) and 106 parts by weight of n-butanol were mixed. The solution was knife-coated on a glass plate with a 60 μm wet film layer thickness and dried at 23° C. for 20 min. Afterwards, the resulting film was washed out with deionized water and dried again. The resulting conductive blue layer had a surface resistance of 312 Ω/sq (measured by the two-point method).

Example 5 (Inventive)

Preparation of an Inventive Conductive Layer Comprising Inventive Polythiophene by Chemical in situ Polymerization with Fe(III)tosylate 1.21 parts by weight of methyl-3,4-ethyleneoxythiathiophene from Example 2, 25 parts by weight of a 40% solution of iron(III) tosylate in n-butanol (Baytron® C-B 40, H. C. Starck GmbH) and 106 parts by weight of n-butanol were mixed. The solution was knife-coated on a glass plate with a 60 μm wet film layer thickness and dried at 23° C. for 20 min. Afterwards, the resulting film was washed out with deionized water and dried again. The resulting conductive blue layer had a surface resistance of 296 Ω/sq (measured by the two-point method).

Example 6 (Inventive)

Preparation of a PSS Complex of the Copolymer of 3,4-ethylenedioxythiophene and 3,4-ethyleneoxythiathiophene 88.02 g of a 6.2% by weight aqueous solution of polystyrenesulphonic acid (PSS, corresponding to 5.46 g of solid PSS, corresponding to 29.7 mmol of $SO_3H$, molecular weight $M_w$ approx. 180 000), 1.0 g of 3,4-ethylenedioxythiophene (7.04 mmol), 1,114 g of 3,4-ethyleneoxythiathiophene (2,3-dihydrothieno[3,4-b][1,4]oxathiine from Example 1, 7.04 mmol) and 3.0 g of $Na_2S_2O_8$ were stirred vigorously in 350 ml of water at 23° C. for 8 h. Afterwards, a further 1.7 g of $Na_2S_2O_8$ were added (total 4.7 g=19.7 mmol) and stirred at 23° C. for a further 16 h. Afterwards, the deep blue mixture was deionized by stirring with in each case 41 g of anion exchanger (Lewatit® MP 62, Bayer AG) and cation exchanger (Lewatit® S 100, Bayer AG) for 8 h and the ion exchangers were subsequently filtered off. For the resulting deep blue inventive dispersion, a solids content of 1.15% by weight was determined. 1.13 parts by weight of this solution were diluted with in each case 1 part by weight of methanol, acetone and water and knife-coated on a PET film in a wet film layer thickness of 60 μm. After the light blue, transparent layer had been dried, a surface resistance of $2 \cdot 10^5$ Ω/sq was measured (two-point method).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. An electrolyte capacitor comprising:
   (a) a layer of an oxidizable metal;
   (b) an oxide layer of said metal;
   (c) a solid electrolyte; and
   (d) a plurality of contacts between said solid electrolyte and said oxide layer,
wherein said solid electrolyte comprises polythiophenes having repeating units selected from the group consisting of general formula (I), and the combination of repeating units of the general formulas (I) and (II)
wherein general formulas (I) and (II) are as follows,

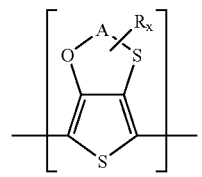

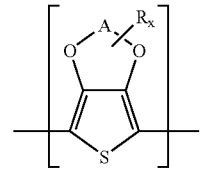

where
   A is selected from the group consisting of $C_1$-$C_5$-alkylene radical and substituted $C_1$-$C_5$-alkylene radical,
   R is selected in each case independently from the group consisting of linear or branched $C_1$-$C_{18}$-alkyl radical, substituted $C_1$-$C_{18}$-alkyl radical, $C_5$-$C_{12}$-cycloalkyl radical, substituted $C_5$-$C_{12}$-cycloalkyl radical, $C_6$-$C_{14}$-aryl radical, substituted $C_6$-$C_{14}$-aryl radical, $C_7$-$C_{18}$-aralkyl radical, substituted $C_7$-$C_{18}$-aralkyl radical, $C_1$-$C_4$-hydroxyalkyl radical, substituted $C_1$-$C_4$-hydroxyalkyl radical, and a hydroxyl radical,
   the substituted $C_1$-$C_5$-alkylene radical, substituted $C_1$-$C_{18}$-alkyl radical, substituted $C_5$-$C_{12}$-cycloalkyl radical, substituted $C_6$-$C_{14}$-aryl radical, substituted $C_7$-$C_{18}$-aralkyl radical and substituted $C_1$-$C_4$-hydroxyalkyl radical each being independently substituted with a member selected from the group consisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and
   x is an integer from 0 to 8,
   wherein said polythiophene optionally comprises counterions.
2. The electrolyte capacitor of claim 1 wherein,
   A is selected from the group consisting of $C_2$-$C_3$-alkylene radical and substituted $C_2$-$C_3$-alkylene radical,
   the substituted $C_2$-$C_3$-alkylene radical being substituted with a member selected from the group consisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and x is 0 or 1.

3. The electrolyte capacitor of claim 1 wherein repeating units of the general formula (I) are present in the polythiophene in a proportion of 1 to 100 mol %, and repeating units of the general formula (II) are present in the polythiophene in a proportion of 99 to 0 mol %, with the proviso that the sum of the two proportions is 100 mol %.

4. The electrolyte capacitor of claim 1 wherein the repeating units of the general formula (I) are represented by the following general formula (Iaa), and the repeating units of general formula (II) are represented by the following general formula (IIaa)

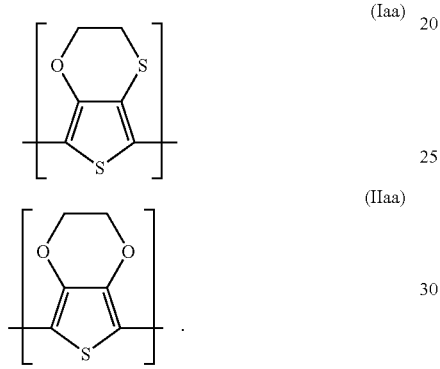

(Iaa)

(IIaa)

5. The electrolyte capacitor of claim 1 wherein the oxidizable metal is selected from the group consisting of valve metals.

6. The electrolyte capacitor of claim 5 wherein the valve metal is selected from the group consisting of tantalum, niobium, aluminium, titanium, zirconium, hafnium, vanadium, alloys of at least one metal thereof with other elements, compounds of at least one metal thereof with other elements, alloys of at least one metal thereof with NbO, compounds of at least one metal thereof with NbO, and combinations thereof.

7. The electrolyte capacitor of claim 1 wherein the counterions are selected from the group consisting of monomeric anions, polymeric anions and combinations thereof.

8. A process for producing an electrolyte capacitor comprising one process selected from the group consisting of process (A) and process (B):

(A) (i) applying to an oxide layer of a metal,
  (i) thiophenes selected from the group consisting of general formula (III) and the combination of the general formulas (III) and (IV),

(III)

-continued

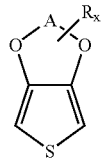

(IV)

wherein

A is selected from the group consisting of $C_1$-$C_5$-alkylene radical and substituted $C_1$-$C_5$-alkylene radical, R is in each case selected independently from the group consisting of linear or branched $C_1$-$C_{18}$-alkyl radical, substituted $C_1$-$C_{18}$-alkyl radical, $C_5$-$C_{12}$-cycloalkyl radical, substituted $C_5$-$C_{12}$-cycloalkyl radical, $C_6$-$C_{14}$-aryl radical, substituted $C_6$-$C_{14}$-aryl radical, $C_7$-$C_{18}$-aralkyl radical, substituted $C_7$-$C_{18}$-aralkyl radical, $C_1$-$C_4$-hydroxyalkyl radical, substituted $C_1$-$C_4$-hydroxyalkyl radical, and a hydroxyl radical, the substituted $C_1$-$C_5$-alkylene radical, substituted $C_1$-$C_{18}$-alkyl radical, substituted $C_5$-$C_{12}$-cycloalkyl radical, substituted $C_6$-$C_{14}$-aryl radical, substituted $C_7$-$C_{18}$-aralkyl radical and substituted $C_1$-$C_4$-hydroxyalkyl radical each being independently substituted with a member selected from the group consisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and x is an integer from 0 to 8, (ii) an oxidizing agent, and (iii) optionally counterions, wherein said thiophene, said oxidizing agent and said optional counterions are applied together or successively, optionally in the form of solutions, and (b) polymerizing, by means of chemical oxidation, the applied thiophenes at temperatures of −10° C. to 250° C. thereby forming polythiophenes having repeating units selected from the group consisting of general formula (I) and the combinations of repeating units of the general formulas (I) and (II),

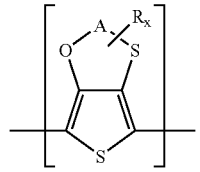

(I)

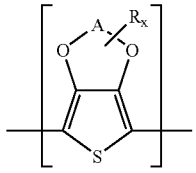

(II)

wherein A, R and x are each as defined with regard to formulas (III) and (IV), and (B) (a) applying to an oxide layer of a metal a composition comprising,
  (i) thiophenes selected from the group consisting of general formula (III), general formula (IV) and combinations thereof, and
  (ii) counterions,
  wherein said composition is applied to said oxide layer at temperatures of −78° C. to 250° C., optionally in the form of a solution, and
(b) polymerizing electrochemically the applied composition, thereby forming polythiophenes having repeating units selected from the group consisting of general formula (I), general formula (II) and combinations thereof.

9. The process of claim 8 wherein the oxidizing agent is selected from the group consisting of alkali metal peroxodisulphates, ammonium peroxodisulphates, hydrogen peroxide, alkali metal perborates, iron(III) salts of organic acids, iron(III) salts of inorganic acids, iron(III) salts of inorganic acids which have organic radicals and combinations thereof.

10. The process of claim 8 wherein the counterions are anions selected from the groups consisting of anions of monomeric alkanesulphonic acids, anions of cycloalkanesulphonic acids, anions of aromatic sulphonic acids and combinations thereof.

11. The process of claim 8 wherein a layer comprising the polythiophenes is formed, and said layer is washed with solvents after the polymerization, and optionally after drying.

12. The process of claim 8 wherein the oxide layer of the metal is electrochemically postanodized (reformation) after the polymerization.

13. An article of manufacture comprising at least one electrically conductive layer comprising,
  (a) polythiophenes having repeating units selected from the group consisting of general formula (I), and the combinations of repeating units of the general formulas (I) and (II)

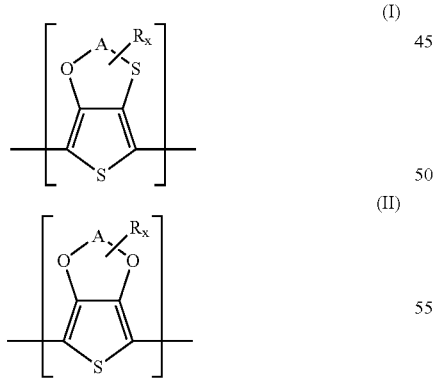

wherein
A is selected from the group consisting of $C_1$-$C_5$-alkylene radical and substituted $C_1$-$C_5$-alkylene radical,
R is in each case selected independently from the group consisting of linear or branched $C_1$-$C_{18}$-alkyl radical, substituted $C_1$-$C_{18}$-alkyl radical, $C_5$-$C_{12}$-cycloalkyl radical, substituted $C_5$-$C_{12}$-cycloalkyl radical, $C_6$-$C_{14}$-aryl radical, substituted $C_6$-$C_{14}$-aryl radical, $C_7$-$C_{18}$-aralkyl radical, substituted $C_7$-$C_{18}$-aralkyl radical, $C_1$-$C_4$-hydroxyalkyl radical, substituted $C_1$-$C_4$-hydroxyalkyl radical, and a hydroxyl radical, the substituted $C_1$-$C_5$-alkylene radical, substituted $C_1$-$C_{18}$-alkyl radical, substituted $C_5$-$C_{12}$-cycloalkyl radical, substituted $C_6$-$C_{14}$-aryl radical, substituted $C_7$-$C_{18}$-aralkyl radical and substituted $C_1$-$C_4$-hydroxyalkyl radical each being independently substituted with a member selected from the group consisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and x is an integer from 0 to 8;

and (b) counterions selected from the group consisting of monomeric anions, polymeric anions and combinations thereof, provided that the counterions are free of hexafluorophosphate.

14. A process for producing the electrically conductive layers of claim 13, comprising:
  (a) applying to a substrate,
    (i) thiophenes of the formula (III) or a combination of the formulas (III) and (IV),

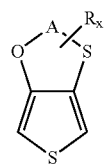

(III)

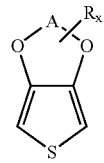

(IV)

wherein A, R and x are each as defined in at least one of claim 13,
    (ii) an oxidizing agent, and
    (iii) optionally counterions,
  wherein the thiophenes, oxidizing agent and optional counterions are applied together or successively, optionally in the form of solutions; and
  (b) polymerizing, by means of chemical oxidation, the applied thiophenes at temperatures of −1° C. to 250° C., thereby forming polythiophenes having repeating units selected from the group consisting of general formula (I), general formula (II) and combinations thereof,
  wherein A, R and x are each as defined with regard to formulas (III) and (IV).

15. A dispersion of cationic polythiophenes comprising:
  (a) cationic polythiophenes having repeating units selected from the group consisting of general formula (I), and the combination of repeating units of the general formulas (I) and (II),

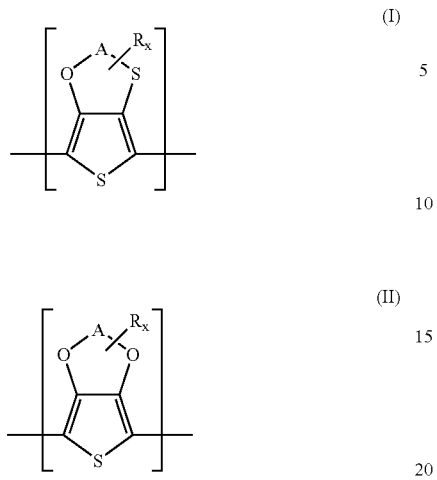

(I)

(II)

wherein

A is selected from the group consisting of $C_1$-$C_5$-alkylene radical and substituted $C_1$-$C_5$-alkylene radical, R is in each case selected independently from the group consisting of linear or branched $C_1$-$C_{18}$-alkyl radical, substituted $C_1$-$C_{18}$-alkyl radical, $C_5$-$C_{12}$-cycloalkyl radical, substituted $C_5$-$C_{12}$-cycloalkyl radical, $C_6$-$C_{14}$-aryl radical, substituted $C_6$-$C_{14}$-aryl radical, $C_7$-$C_{18}$-aralkyl radical, substituted $C_7$-$C_{18}$-aralkyl radical, $C_1$-$C_4$-hydroxyalkyl radical, substituted $C_1$-$C_4$-hydroxyalkyl radical, and a hydroxyl radical, the substituted $C_1$-$C_5$-alkylene radical, substituted $C_1$-$C_{18}$-alkyl radical, substituted $C_5$-$C_{12}$-cycloalkyl radical, substituted $C_6$-$C_{14}$-aryl radical, substituted $C_7$-$C_{18}$-aralkyl radical and substituted $C_1$-$C_4$-hydroxyalkyl radical each being independently substituted with a member selected from the group consisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and x is an integer from 0 to 8, (b) at least one counterion selected from the group consisting of polymeric anions; and (c) at least one solvent.

16. The dispersion of claim 15 wherein the solvent is water.

17. The dispersion of claim 15 wherein said counterion is selected from the group consisting of polymeric carboxylic anions, sulphonic acid anions, and combinations thereof.

18. The dispersion of claim 15 wherein the counterions are selected from anions of polystyrenesulphonic acid (PSA).

19. A process for producing the dispersion of claim 15, comprising, polymerizing, by oxidative means, thiophenes selected from the group consisting of general formula (III) and general formula (III) in combination with the general formula (IV),

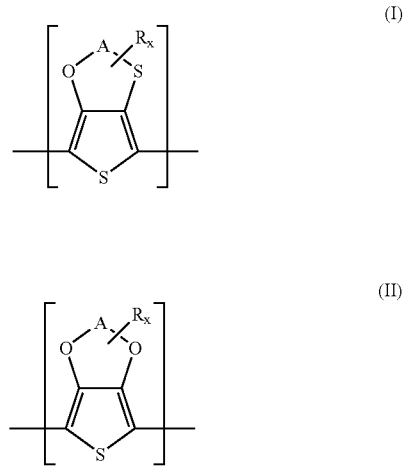

(I)

(II)

wherein A, R and x are each as defined in claim 15,
wherein the polymerization is performed in the presence of,
(i) at least one oxidizing agent,
(ii) at least one solvent, and
at least one polymeric anion of a polymeric acid.

20. A polythiophene comprising repeating units selected from the group consisting of general formula (I) and the combination of repeating units of the general formula (I) and (II)

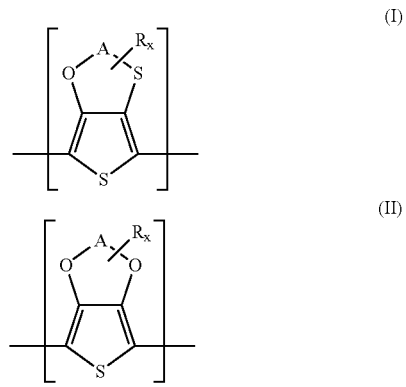

(I)

(II)

wherein

A is selected from the group consisting of $C_1$-$C_5$-alkylene radical and substituted $C_1$-$C_5$-alkylene radical, R is in each case selected independently from the group consisting of linear or branched $C_1$-$C_{18}$-alkyl radical, substituted $C_1$-$C_{18}$-alkyl radical, $C_5$-$C_{12}$-cycloalkyl radical, substituted $C_5$-$C_{12}$-cycloalkyl radical, $C_6$-$C_{14}$-aryl radical, substituted $C_6$-$C_{14}$-aryl radical, $C_7$-$C_{18}$-aralkyl radical, substituted $C_7$-$C_{18}$-aralkyl radical, $C_1$-$C_4$-hydroxyalkyl radical, substituted $C_1$-$C_4$-hydroxyalkyl radical, and a hydroxyl radical, the substituted $C_1$-$C_5$-alkylene radical, substituted $C_1$-$C_{18}$-alkyl radical, substituted $C_5$-$C_{12}$-cycloalkyl radical, substituted $C_6$-$C_{14}$-aryl radical, substituted $C_7$-$C_{18}$-aralkyl radical and substituted $C_1$-$C_4$-hydroxyalkyl radical each being independently substisisting of alkyl, cycloalkyl, aryl, halogen, ether, thioether, disulphide, sulphoxide, sulphone, sulphonate, amino, aldehyde, keto, carboxylic ester, carboxylic acid, carbonate, carboxylate salt, cyano, alkylsilane and alkoxysilane groups, carboxamide groups and combinations thereof, and X is an integer from 0 to 8, wherein said polythiophene is selected from neutral polythiphenes, cationic polythiophenes and combinations thereof, said polythiophene comprises repeating units of the general formula (I) in a proportion of 1 to 100 mol %, and repeating units of the general formula (II) in a proportion of 99 to 0 mol %, with the proviso that the sum of the two proportions is 100 mol %, and provided that when the polythiophene is a cationic polythiophene, said cationic polythiophene comprises counterions selected from polymeric anions.

21. The polythiophene of claim 20 comprising repeating units of the general formula (I) in a proportion of 20 to 95 mol %, and repeating units of the general formula (II) in a proportion of 80 to 5 mol %, with the proviso that the sum of the two proportions is 100 mol %.

22. The polythiophene of claim 20 wherein the repeating units of the general formula (I) are represented by the following formula (Iaa), and the repeating units of general formula (II) are represented by the following formula (IIaa),

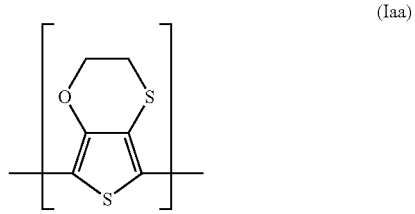

(Iaa)

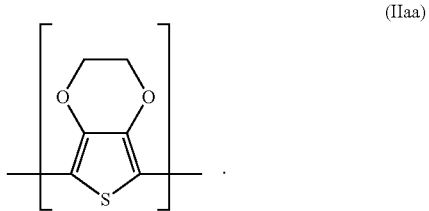

(IIaa)

* * * * *